United States Patent
Depond

(10) Patent No.: US 10,622,815 B2
(45) Date of Patent: Apr. 14, 2020

(54) ANALOGUE OVERALL BALANCING SYSTEM FOR AN ASSEMBLY OF CAPACITIVE-EFFECT ELECTRICAL ENERGY STORAGE DEVICES, RECHARGEABLE STORAGE MODULE, ELECTRIC VEHICLE AND ELECTRICAL INSTALLATION COMPRISING SUCH A SYSTEM

(71) Applicant: BLUE SOLUTIONS, Ergue Gaberic (FR)

(72) Inventor: Jean-Michel Depond, Quimper (FR)

(73) Assignee: BLUE SOLUTIONS, Ergue Gaberic (FR)

(*) Notice: Subject to any disclaimer, the term of this patent is extended or adjusted under 35 U.S.C. 154(b) by 0 days.

(21) Appl. No.: 16/342,306

(22) PCT Filed: Nov. 15, 2017

(86) PCT No.: PCT/EP2017/079250
§ 371 (c)(1),
(2) Date: Apr. 16, 2019

(87) PCT Pub. No.: WO2018/091490
PCT Pub. Date: May 24, 2018

(65) Prior Publication Data
US 2019/0280490 A1    Sep. 12, 2019

(30) Foreign Application Priority Data
Nov. 18, 2016  (FR) .................................. 16 61243

(51) Int. Cl.
*H02J 7/00*       (2006.01)
*B60L 53/55*     (2019.01)
(Continued)

(52) U.S. Cl.
CPC ............ *H02J 7/0016* (2013.01); *B60L 50/40* (2019.02); *B60L 53/55* (2019.02); *H02J 7/345* (2013.01); *Y02T 10/7055* (2013.01)

(58) Field of Classification Search
CPC ......... H02J 7/0016; H02J 7/345; B60L 50/40; B60L 53/55
(Continued)

(56) References Cited

U.S. PATENT DOCUMENTS 5,666,040 A * 9/1997 Bourbeau ............. H01M 2/348
                                                          320/118
5,768,115 A * 6/1998 Pascucci ................ G11O 5/145
                                                          307/110
(Continued)

FOREIGN PATENT DOCUMENTS

EP    1583200 A1    10/2005
EP    3051659 A1    8/2016

OTHER PUBLICATIONS

International Search Report from International Patent Application No. PCT/EP2017/079250, dated Jan. 26, 2018.
(Continued)

*Primary Examiner* — M Baye Diao
(74) *Attorney, Agent, or Firm* — Greer, Burns & Crain Ltd.

(57) ABSTRACT

Provided is an analogue system for balancing a rechargeable electrical energy storage assembly including a plurality of capacitive-effect electrical energy storage devices connected to one another in series, the system including a balancing device for each storage device, including: a bypass circuit for the storage device, and a first comparator, arranged to control the bypass circuit according to the voltage across the terminals of the storage device and according to a balancing voltage; a second comparator, arranged to control an open state of the bypass circuit of each storage device according (Continued)

to a switch-off voltage, and according to the voltage across the terminals of each storage device.

18 Claims, 6 Drawing Sheets

(51) Int. Cl.
    *B60L 50/40*     (2019.01)
    *H02J 7/34*     (2006.01)

(58) Field of Classification Search
    USPC .......................................................... 320/122
    See application file for complete search history.

(56) References Cited

U.S. PATENT DOCUMENTS

| | | | |
|---|---|---|---|
| 6,362,599 B1* | 3/2002 | Turner | H02J 7/0063 320/104 |
| 6,977,483 B2* | 12/2005 | Iwashima | G01R 31/396 320/122 |
| 7,589,480 B2* | 9/2009 | Greenwood | H05B 41/2882 315/224 |
| 9,768,629 B2* | 9/2017 | Jestin | H02J 7/0016 |
| 9,825,552 B1* | 11/2017 | Usami | H02M 1/4241 |
| 9,994,237 B2* | 6/2018 | Jestin | B60L 53/22 |
| 10,344,921 B2* | 7/2019 | Xiong | H05B 33/0803 |
| 10,408,864 B2* | 9/2019 | Yamaguchi | H02J 7/0021 |
| 2004/0251934 A1 | 12/2004 | Yano et al. | |
| 2009/0026845 A1* | 1/2009 | Shin | G05F 1/14 307/130 |

OTHER PUBLICATIONS

Written Opinion of the International Searching Authority from International Patent Application No. PCT/EP2017/079250, dated Jan. 26, 2018.

* cited by examiner

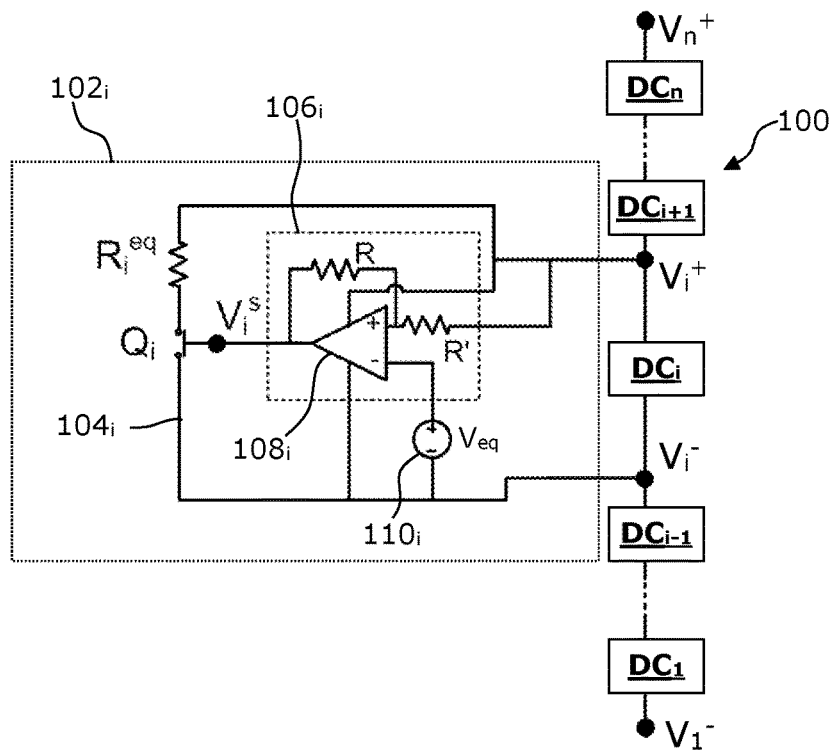
FIG. 1a: Prior Art
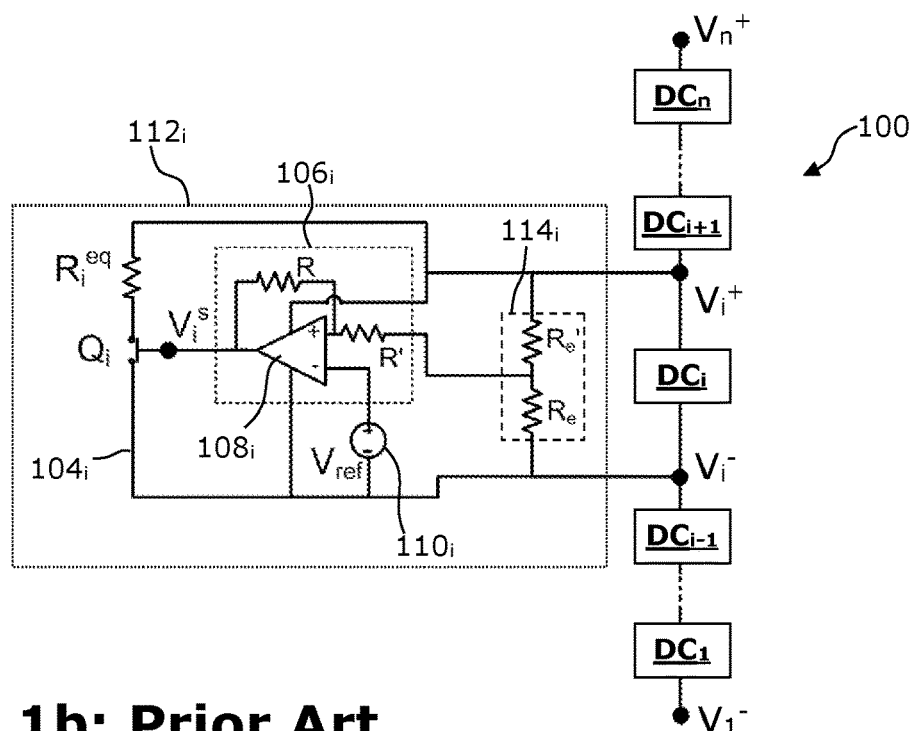
FIG. 1b: Prior Art

ANALOGUE OVERALL BALANCING SYSTEM FOR AN ASSEMBLY OF CAPACITIVE-EFFECT ELECTRICAL ENERGY STORAGE DEVICES, RECHARGEABLE STORAGE MODULE, ELECTRIC VEHICLE AND ELECTRICAL INSTALLATION COMPRISING SUCH A SYSTEM

BACKGROUND

The present invention relates to an analogue balancing system for an assembly of capacitive-effect storage devices connected together in series. It also relates to a rechargeable electrical energy storage module, an electric vehicle and an electrical supply installation implementing such a system.

The field of the invention is the field of means for balancing supercapacitors connected in series.

A supercapacitor performs capacitive-effect electrical energy storage. The main limitation of a supercapacitor is that it only operates at very low voltage. In order to reach the desired operating voltage, supercapacitors are placed in series in a rechargeable electrical energy storage module.

However, due to manufacturing differences or ageing differences, the supercapacitors of one and the same storage module only rarely charge at the same speed. In order to ensure a greater homogeneity of voltage at the terminals of the supercapacitors in series, a balancing system is provided, in an analogue form for reasons of cost, reliability, feasibility and robustness.

This analogue balancing system provides for diverting, during a charging phase, at least a portion of the current for each supercapacitor, individually, when the voltage at its terminals exceeds a predetermined voltage called balancing voltage. At the end of the charging phase, if the balancing voltage is exceeded for all the supercapacitors, which is generally the case, all the supercapacitors are therefore by-passed.

Thus, when the charging phase is not immediately followed by a discharge phase, but by a voltage maintenance phase or a rest phase, each supercapacitor remains by-passed and discharges to the bypass circuit while the voltage at its terminals is greater than the balancing voltage. In other words, during a voltage maintenance phase, or rest phase, separating a charging phase from a discharge phase, the supercapacitors discharge to the bypass circuit when they are not in use. Due to this, a loss of energy takes place, compensated in the case of a voltage maintenance phase, not compensated in the case of a rest phase, which is costly in all cases, and reduces the efficiency and the autonomy of the supercapacitors, and therefore of the storage module.

An aim of the present invention is to overcome these drawbacks.

Another aim of the invention is to propose a balancing system that is more efficient for an assembly of capacitive-effect storage devices in series.

It is also an aim of the invention to propose a balancing system for an assembly of capacitive-effect storage devices in series making it possible to reduce, or even eliminate, the energy losses, and to increase the efficiency and the operating range of said assembly.

SUMMARY

The invention makes it possible to achieve at least one of these aims by means of an analogue balancing system for an electrical energy storage assembly comprising a plurality of capacitive-effect storage devices connected together in series, said system comprising a balancing device for each storage device, said balancing device comprising:

a bypass circuit of said storage device, that can be actuated between a closed state and an open state, and a voltage comparator, called first comparator, arranged in order to actuate said bypass circuit to an open or closed state, as a function of the voltage at the terminals of said storage device and a predetermined voltage, called balancing voltage, denoted $V_{eq}$ hereinafter;

said system being characterized in that it also comprises at least one other voltage comparator, called second comparator, arranged in order to actuate an open or closed state of the bypass circuit of each storage device, as a function of:

a voltage, called switch-off voltage, representative of a closed state of all the bypass circuits of all the storage devices of said assembly, and the voltage at the terminals of each storage device of said assembly, or of the voltage at the terminals of said assembly.

Thus, the system according to the invention switches off, i.e. changes to an open state, the bypass circuit of each storage device, when all the bypass circuits of all the storage devices are in a switched-on state, i.e. a closed state. Thus, the system according to the invention makes it possible to avoid all the storage devices remaining by-passed, by means of current bypass circuits, after a charging phase. For this reason, the system according to the invention makes it possible to avoid all the storage devices discharging to the bypass circuits, and in particular to the bypass resistors of said bypass circuits between a charging phase and a discharge phase.

As a result, the system according to the invention makes it possible to carry out a more efficient balancing, reduce the energy losses and increase the efficiency and the autonomy of the storage assembly.

In addition, actuation of all the bypass circuits is carried out centrally by the second comparator, which is common to all the storage devices. The system according to the invention thus has a reduced cost and bulk.

In the present application, by "capacitive-effect storage device", also called "storage device", is meant a device comprising, or formed by, one or more supercapacitors connected together in series or in parallel.

In the majority of cases, but non-limitatively, each capacitive-effect storage device comprises a single supercapacitor.

According to a first configuration, the first comparator directly receives the voltage $V_i$ at the terminals of the storage device. In this case, it directly compares the voltages $V_i$ and $V_{eq}$.

Alternatively, a voltage divider can be used in order to adapt the voltage $V_i$ at the input of the first comparator. The first comparator thus receives an input voltage $V_i^E$ such that $V_i^E = V_i/D_i$. In this case, the first comparator compares the voltage $V_i^E$ to a voltage, called reference voltage, denoted $V_{ref}$, selected such that $V_{ref} = V_{eq}/D_i$.

Preferentially, when $2 \text{ V} \leq V_{eq} \leq 3 \text{ V}$, the assembly of storage devices can comprise a number n of storage devices in series, such that $8 \leq n \leq 14$, and in particular $10 \leq n \leq 12$.

According to a particularly advantageous characteristic, the second comparator can be referenced to the potentials at the terminals of the storage assembly, and is configured in order to supply at the output:

in a first state: the lowest potential at the terminals of the storage assembly, denoted $V_1^-$; and in a second state: the highest potential at the terminals of the storage assembly, denoted $V_n^+$.

Thus, the second comparator is referenced and adapts to the variation, over time, of the voltage at the terminals of the storage assembly, which makes it possible to carry out more efficient and accurate balancing.

In addition, it is not necessary to provide an additional voltage source in order to reference the second comparator, which reduces the cost and the bulk of the system according to the invention.

Finally, this embodiment has the advantage of working in a voltage range which does not exceed the maximum voltage at the terminals of the storage assembly, which makes it possible to use less expensive and less bulky components compared to components operating at very high voltage.

Advantageously, the system according to the invention can comprise a weighted summer receiving the voltage supplied by each of the first comparators, denoted $V_i^s$ and supplying a voltage, denoted $V_\Sigma^s$, corresponding to a weighted sum of said voltages, said weighted sum voltage $V_\Sigma^s$ being used by the second comparator in order to actuate all the bypass circuits.

Alternatively, the weighted summer can receive the voltage at the terminals of each storage device, and supply a voltage $V_\Sigma^s$ corresponding to a weighted sum of said voltages, said weighted sum voltage being used by the second comparator in order to actuate all the bypass circuits.

Thus, the second comparator carries out a comparison of a weighted sum of the voltages relative to all the storage devices with the switch-off voltage.

The fact of weighting the voltages makes it possible to work in a convenient voltage range, avoiding the use of very high-voltage components which are costly, complex and bulky.

Advantageously, the weighting can be carried out as a function of the number of storage devices in the storage assembly.

In particular, for n identical storage devices having one and the same balancing voltage $V_{eq}$, the weighting can be a function of a weighting coefficient, denoted k, obtained by means of the following relationship:

$$k = \sum_{i=1}^{n} \frac{1}{i}$$

Advantageously, the weighted summer can be referenced to the potentials at the terminals of the storage assembly and supplies a weighted sum voltage less than or equal to the difference between said potentials.

Thus, the maximum voltage supplied by the weighted summer is less than or equal to the voltage at the terminals of the storage assembly, which makes it possible to work within a voltage range without using components that are costly and bulky.

The system according to the invention can advantageously comprise a means of introducing a voltage, called compensation voltage, corresponding to a voltage offset introduced at the level of at least one, and in particular all, of the first comparators.

Such a voltage offset can be due to the architecture and to the operating differences of the first comparators.

Such a means of introducing a compensation voltage can be arranged at the level of the weighted summer, in the form of an additional branch at the input of the weighted summer, introducing said compensation voltage.

Such a means of introducing a compensation voltage can be a second summer, placed in cascade at the output or downstream of the weighted summer. Such a second summer can add the weighted sum voltage supplied by the weighted summer to a compensation voltage, the latter able to be supplied by a voltage source provided for this purpose.

According to yet another alternative, this compensation voltage can be taken into account in determining the switch-off voltage.

According to an embodiment, the system according to the invention can comprise a means supplying the switch-off voltage, denoted $V_\Sigma$, as a function of the voltage at the terminals of the storage assembly, and optionally of a voltage representing a safety margin.

According to a particular embodiment example that is in no way limitative, the means supplying the switch-off voltage can comprise a subtractor, referenced to the potentials at the terminals of the storage assembly, supplying the switch-off voltage as a function of the voltage at the terminals of the storage assembly and of the voltage representing a safety margin.

In particular, the subtractor can be arranged in order to supply the switch-off voltage according to the following relationship:

$$V_\Sigma = V - \delta V$$

where V is the voltage at the terminals of the storage assembly, i.e. $V = V_n^+ - V_1^-$, and $\delta V$ is the voltage representing the safety margin.

For at least one, in particular each, storage device, the first comparator of the balancing device of said storage device can be referenced to the potentials at the terminals of said storage device.

Advantageously, for at least one, in particular each, storage device, the first comparator of the balancing device of said storage device can be arranged so that:
  its positive input is connected directly to the highest potential at the terminals of said storage device, respectively via a voltage divider,
  its negative input is connected to a voltage source, itself referenced to the lowest potential at the terminals of said storage device, and supplying the balancing voltage, respectively a reference voltage.

Advantageously, the system according to the invention can comprise for at least one, in particular each, storage device, a voltage divider supplying to the first comparator an input voltage, denoted $V_i^E$, that is proportional to and less than the voltage $V_i$ at the terminals of said storage device, so that $V_i^E = V_i/D_i$. Thus, it is possible to use a voltage source supplying a voltage $V_{ref} = V_{eq}/D_i$, existing on the market for the comparison performed by the first comparator.

Indeed, from a practical point of view, in analogue electronics the voltage sources have determined and fixed values. They therefore do not necessarily supply the desired balancing voltage $V_{eq}$.

As described above, when the first comparator receives the input voltage $V_i$ at the terminals of the storage device, denoted $DC_i$ hereinafter, without using a voltage divider, then the first comparator performs a comparison between said voltage $V_i$ and the balancing voltage $V_{eq}$.

When the first comparator receives at the input an input voltage $V_i^E$ supplied by a voltage divider, applying a division coefficient $D_i$ to the voltage $V_i$ at the terminals of the storage device $DC_i$ such that:

$$V_i^E = \frac{V_i}{D_i}$$

then the first comparator performs a comparison between said input voltage $V_i^E$ and a reference voltage, denoted $V_{ref}$, such that:

$$V_{ref} = \frac{V_{eq}}{D_i}$$

According to a non-limitative embodiment example, each voltage divider can be made by means of resistance bridges.

In addition, at least one, and in particular each, of the first and second comparators can be a hysteresis comparator.

Such a hysteresis comparator makes it possible to avoid the phenomenon of oscillation of the control signal supplied by said comparator.

According to a first embodiment example, at least one, in particular each, bypass circuit can comprise two switches, mounted in series in said bypass circuit, one actuated as a function of the voltage supplied by the first comparator and the other actuated as a function of the voltage supplied by the second comparator.

Alternatively, or in addition, at least one, in particular each, bypass circuit can comprise a single switch, the balancing device further comprising a control means of said single switch, as a function of the voltages supplied by the first and second comparators.

Thus, the cost, the electricity consumption and the bulk of the system according to the invention are reduced.

According to a first embodiment example, for at least one, in particular each, balancing device, the control means of the single switch can comprise:
 a transistor that is off by default, for example a bipolar transistor of the NPN type, in particular when the second comparator is an inverting comparator, or
 a transistor that is on by default, for example a bipolar transistor of the PNP type, in particular when the second comparator is a non-inverting comparator.

In the case where a bipolar transistor is used, then the base of said bipolar transistor is connected to the second comparator, the collector to the first comparator and the emitter to the single switch.

In this case, the transistor emitter voltage, denoted $V_i^c$ can be used in order to actuate the single switch associated with the storage device $DC_i$.

According to a particularly advantageous characteristic, the system according to the invention can also comprise a device for monitoring the operation of said balancing system, and optionally for signalling an operating fault of said system.

According to a first embodiment, the monitoring device performs monitoring of the operation of said balancing system as a function of the voltage supplied by the second comparator.

Such a device can be arranged in order to monitor the variation of the control voltage supplied by the second comparator, and in particular in order to determine if this voltage reaches a first predefined value in order to switch off the bypass circuits, then a second predefined value obtained when at least one circuit is switched off, etc.

According to a second embodiment, and when the bypass circuit of each balancing device comprises a single switch actuated by a control means of said single switch as a function of the voltages supplied by the first and second comparators, the device for monitoring the operation of said system can perform monitoring as a function of the control voltages of said single switches of all the balancing devices.

In particular, the control device can implement comparison of the weighted sum of the control voltages to a threshold voltage. The threshold voltage can be the voltage at the terminals of the storage assembly.

According to a non-limitative embodiment example, the monitoring device can perform the following comparison, by means of a comparator referenced to the potentials at the terminals of the storage assembly:

$$V_\Sigma^c \leq \left(1 - \frac{k}{n}\right) V_n^+$$

where $V_\Sigma^c$ is the weighted sum of the control voltages, $$\left(1 - \frac{k}{n}\right)$$

is a weighting coefficient and $V_n^+$ is the threshold voltage, this voltage also corresponding to the voltage at the terminals of the storage assembly.

To this end, the monitoring device can comprise a weighted summer, called second weighted summer, and a voltage comparator, called third comparator, both referenced to the potentials at the terminals of the storage assembly.

According to a third embodiment, and when the bypass circuit of each balancing device comprises a single switch actuated by a control means of said single switch, the device for monitoring the operation of said system can perform monitoring as a function of:
 the control voltage of said single switch, and
 the voltage supplied by the first comparator;
of each balancing device.

In particular, in a non-limitative embodiment example of this third embodiment, the monitoring device can comprise, for each balancing device:
 a controllable switch, called fourth switch, and
 a comparator, called fourth comparator, in order to actuate said fourth controllable switch.

All the fourth switches can be connected together in series between two different electrical potentials, such as for example the potentials at the terminals of the storage assembly.

Each fourth comparator, associated with a balancing device, performs a comparison of:
 the control voltage of the single switch of the balancing device, and
 the voltage supplied by the first comparator of said balancing device,
in order to actuate the fourth controllable switch which is associated therewith, as a function of said comparison.

Each pair (4th switch+4th comparator) associated with a balancing device can be configured so that the 4th switch is actuated to a closed state when the single switch of said balancing device moves to a closed state.

In particular:
 each 4th comparator can be an inverting comparator, respectively a non-inverting comparator; and
 each 4th switch can be a transistor that is off by default, for example a bipolar transistor of the NPN type, respectively a transistor that is on by default, for example a bipolar transistor of the PNP type.

According to another aspect of the same invention, a rechargeable electrical energy storage module is proposed, comprising:

at least one rechargeable electrical energy storage assembly, each comprising a plurality of capacitive-effect electrical energy storage devices connected together in series within said assembly, and for at least one, in particular each, storage assembly, a balancing system according to the invention.

The energy storage module can comprise several storage assemblies.

At least two, in particular all, the assemblies can be placed together in series. Alternatively, or in addition, at least two, in particular all, the assemblies can be placed together in parallel.

At least two, in particular all, the assemblies can comprise an identical number or a different number of storage devices.

According to another aspect of the present invention, a hybrid or electric transport vehicle is proposed comprising one or more rechargeable electrical energy storage module(s) according to the invention.

By "transport vehicle" is meant any type of means for transporting people or objects, such as a bus, a car, a tyred tram, a boat, a lorry, a cable car, a lift, a goods lift, a crane etc.

According to yet another aspect of the same invention, an electrical installation is proposed comprising one or more rechargeable electrical energy storage module(s) according to the invention.

Such an electrical installation can be an electrical charging station for electric or hybrid transport vehicles, or an electrical supply station of a building, a complex or an electric/electronic communication device.

Such an electric installation can be a regulation or smoothing station or buffer storage for electrical energy, for example supplied by an electrical grid or electricity production means. Such a regulation or smoothing station makes it possible to store surplus electrical energy during a period of low consumption, respectively of high production, and to release the stored electrical energy during a period of high consumption, respectively of low production.

Advantageously, the installation according to the invention can comprise a means for producing electrical energy from a renewable source, such as at least one solar panel and/or at least one wind turbine and/or at least one marine turbine.

The energy produced by such a means can be used in order to recharge at least one rechargeable electrical energy storage module.

Alternatively, or in addition, at least one rechargeable electrical energy storage module can be recharged from the power grid.

BRIEF DESCRIPTION OF THE DRAWINGS

Other advantages and characteristics will become apparent on examination of the detailed description of embodiments which are in no way limitative, and the attached drawings, in which:

FIGS. 1a and 1b show schematic diagrams of two embodiment examples of a controlled-resistor balancing system according to the state of the art;

DETAILED DESCRIPTION

Figure 2:
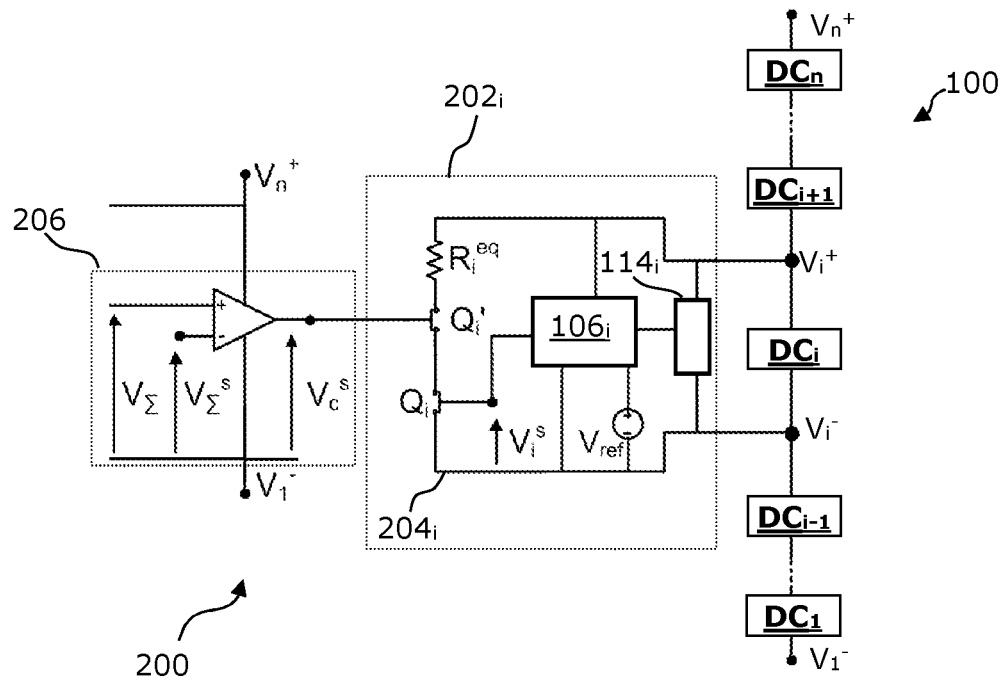
FIG. 2 is a representation of the schematic diagram of a first embodiment example of a controlled-resistor balancing system according to the invention.

It is understood that the embodiments which will be described below are in no way limitative. In particular, variants of the invention can be envisaged that comprise only a selection of the features described below in isolation from the other features described, if this selection of features is sufficient to provide a technical advantage or to differentiate the invention from the prior art. This selection comprises at least one preferably functional feature without structural detail, or with only some of the structural details if this part alone is sufficient to provide a technical advantage or to distinguish the invention with respect to the state of the prior art.

In the figures, the elements common to several figures retain the same reference.

In the following examples, but in a manner that is non-limitative of the invention, all the storage devices $DC_i$ are considered to be identical and to have the same balancing voltage $V_{eq}$. Of course, the invention is not limited to these examples and it is possible to use storage devices $DC_i$ which are different from one another and which do not have the same balancing voltage.

FIGS. 1a and 1b are representations of the electrical schematic diagrams of two examples of a controlled-resistor balancing system according to the state of the art.

FIGS. 1a and 1b show a storage assembly 100 comprising n capacitive-effect storage devices $DC_1, \ldots, DC_n$ that are connected in series and identical. The storage device $DC_1$ is located on the side of the lowest electrical potential, denoted $V_1^-$, of the storage assembly 100 and the storage device $DC_n$ is located on the side of the highest electrical potential, denoted $V_n^+$, of the storage assembly 100.

The system shown in FIGS. 1a and 1b comprises a controlled-resistor balancing device associated with each storage device $DC_i$.

Hereinafter, in order not to overload the diagrams, only the balancing device $102_i$, associated with the storage device $DC_i$, is shown in FIGS. 1a and 1b. The balancing devices of the other storage devices of the storage assembly 100 are on the same principle as the balancing device $102_i$, shown in FIGS. 1a and 1b, and in particular identical to the balancing device $102_i$ in the case where the storage devices $DC_i$ have one and the same balancing voltage $V_{eq}$.

The balancing device 102: comprises a bypass circuit $104_i$, connected in parallel to the terminals of the storage device $DC_i$ and comprising a switch $Q_i$ in series with a balancing resistor $R_i^{eq}$.

The balancing device 102: also comprises a hysteresis comparator $106_i$, called first comparator, in order to actuate the state of the switch $Q_i$. The first comparator $106_i$ is formed by an operational amplifier $108_i$ and two resistors R and R' the values of which fix the hysteresis width. The resistors R and R' are selected to be sufficiently large that the current that passes through them is negligible, typically R>10 k$\Omega$ and R'>10 k$\Omega$.

The operational amplifier $108_i$ is referenced to the potentials, denoted $V_i^+$ and $V_i^-$, at the terminals of the storage device $DC_i$ with which the balancing device $102_i$ is associated.

In the example shown in FIG. 1a, the positive input (+) of the operational amplifier $108_i$, is connected to the highest potential, denoted $V_i^+$, at the terminals of the storage device $DC_i$ with which the balancing device $102_i$ is associated. The negative input (−) of the operational amplifier $108_i$ is connected to a voltage source $110_i$, itself referenced to the lowest potential, denoted $V_i^-$, at the terminals of the storage device $DC_i$.

In the example shown in FIG. 1a, the voltage source $110_i$ supplies the balancing voltage $V_{eq}$ at which it is sought to by-pass the storage device $DC_i$.

In this case, the comparator $106_i$ directly compares the voltage $V_i$ at the terminals of the storage device $DC_i$ to the balancing voltage $V_{eq}$, and operates in the following manner:

- if $V_i$ (=$V_i^+ - V_i^-$)<$V_{eq}$ then the voltage supplied by the first comparator $106_i$, denoted $V_i^s$, is equal to $V_i^-$ (=−$V_{sat}$ local): in other words, if the voltage $V_i$ at the terminals of the storage device $DC_i$ is less than the balancing voltage $V_{eq}$ then $V_i^s = V_i^-$; and
- if $V_i$ (=$V_i^+ - V_i^-$)≥$V_{eq}$ then $V_i^s = V_i^+$ (=+$V_{sat}$ local).

The voltage $V_i^s$ is used in order to actuate the switch $Q_i$ to a closed state or to an open state.

In the example shown in FIG. 1a, the switch $Q_i$ can be an N-channel MOSFET, the gate of which receives the voltage $V_i^s$;

- when the value of $V_i^s$ is $V_i^-$ (i.e. when the voltage $V_i$ at the terminals of the storage device $DC_i$ is less than the balancing voltage $V_{eq}$) then the gate-source voltage is zero and the switch $Q_i$ is off/open: the bypass circuit $104_i$ is open and does not carry any current; and
- when the value of $V_i^s$ is $V_i^+$ (i.e. when the voltage $V_i$ at the terminals of the storage device $DC_i$ is greater than or equal to the balancing voltage $V_{eq}$) then the gate-source voltage is non-zero and the switch $Q_i$ is on/closed: the bypass circuit $104_i$ is closed and carries passing current to the balancing resistor $R_i^{eq}$.

FIG. 1b gives another embodiment example of a controlled-resistor balancing device. The balancing device $112_i$, in FIG. 1b, comprises a voltage divider $114_i$, connected as a shunt to the terminals of the storage device DC and formed by resistors $R_e$ and $R_e'$. The voltage divider $114_i$ is used in order to adapt the voltage $V_i$ ($V_i = V_i^+ - V_i^-$) at the terminals of the storage device $DC_i$. Indeed, from a practical point of view, in analogue electronics the voltage sources have determined and fixed values. They therefore do not necessarily correspond to the value of the desired balancing voltage $V_{eq}$ for the storage device $DC_i$. Thus, the switch $106_i$ receives at input not the voltage $V_i$, but an input voltage $V_i^E$ such that $V_i^E = V_i/D$, where D is the division coefficient applied by the voltage divider $114_i$, such that:

$$D = \frac{R_e + R_e'}{R_e}$$

In this case, the source $110_i$ does not supply the balancing voltage $V_{eq}$, but a reference voltage, denoted $V_{ref}$, such that $V_{ref} = V_{eq}/D$.

In other words, it is:

$$\frac{R_e}{R_e + R_e'} = \frac{V_{ref}}{V_{eq}}$$

In other words, in the embodiment example $V_{ref} \neq V_{eq}$ and $$V_{ref} = V_{eq}\left(\frac{R_e}{R_e + R_e'}\right)$$

Moreover, the balancing device $112_i$, shown in FIG. 1b, comprises all the elements of the balancing device $102_i$ in FIG. 1a.

Unlike the device $102_i$ in FIG. 1a, in the device $112_i$ in FIG. 1b, the positive input (+) of the operational amplifier $108_i$ is connected to said voltage divider $114_i$. The resistors $R_e$ and $R_e'$, forming the voltage divider, are selected to be sufficiently large that the current that passes through them is negligible, typically $R_e$>10 k$\Omega$ and $R_e'$>10 k$\Omega$.

In this case, the voltage comparator $106_i$ performs a comparison:

- of the reference voltage $V_{ref}$ (and not the voltage $V_{eq}$)
- at the input voltage $V_i^E$, supplied by the voltage divider $114_i$.

In the examples described, the comparator $106_i$ is a hysteresis comparator. Alternatively, the comparator $106_i$ may not be a hysteresis comparator.

FIG. 2 is a representation of the schematic diagram of a first non-limitative embodiment example of a balancing system according to the invention.

The balancing system 200 in FIG. 2 comprises for each storage device $DC_1, \ldots, DC_n$, an identical controlled-resistor balancing device since the storage devices $DC_1, \ldots, DC_n$ are identical.

In order not to overload the diagram, only the balancing device 2021, connected to the storage device $DC_i$, is shown in FIG. 2.

The balancing device $202_i$ comprises a bypass circuit $204_i$ of the storage device $DC_i$ comprising the balancing resistor $R_1^{eq}$ in series with the switch $Q_i$. The bypass circuit $204_i$ also comprises a second switch $Q_i'$, in series with the first switch $Q_i$.

In the same manner as in the balancing device $112_i$ in FIG. 1b, the first switch $Q_i$ is actuated by the voltage $V_i^s$ supplied by the comparator $106_i$, using a voltage divider $114_i$.

The system 200 also comprises a second comparator 206, supplying a control voltage, denoted $V_c^s$, of the second switch $Q_i'$ which makes it possible to actuate the state (closed or open) of said second switch $Q_i'$. This second comparator 206 is common to all the balancing devices 202 of all the storage devices $DC_1, \ldots, DC_n$.

The control voltage $V_c^s$, supplied by the second comparator 206, is a function of:

a switch-off voltage, denoted $V_\Sigma$, which is a threshold voltage reached when all the bypass circuits $204_i$ of all the storage devices $DC_i$ are in a switched-on state, i.e. in a closed state; and a voltage, denoted $V_\Sigma^s$, obtained as a function of the voltages $V_i, \ldots, V_n$, at the terminals of all the storage devices $DC_1, \ldots, DC_n$.

In particular, in a non-limitative manner, the voltage $V_\Sigma^s$ is a function of a weighted sum of the voltages $V_1, \ldots, V_n$, at the terminals of all the storage devices $DC_1, \ldots, DC_n$, as will be described in more detail in the remainder of the application, with reference to FIG. 4.

In the example shown, the second comparator 206 is an inverting comparator, referenced to the potentials at the terminals of the storage assembly 100, i.e. to the potentials $V_n^+$ and $V_1^-$, such that:

$V_c^s = V_n^+$ when $V_\Sigma^s < V_\Sigma$, i.e. when all the bypass circuits are not switched to a closed state, and $V_c^s = V_1^-$ if $V_\Sigma^s \geq V_\Sigma$, i.e. when all the bypass circuits are switched to a closed state.

In the example shown in FIG. 2, the switch $Q_i'$ can be an N-channel MOSFET, the gate of which receives the voltage $V_c^s$:

when the value of $V_c^s$ is $V_n^+$ (i.e. when $V_\Sigma^s < V_\Sigma$) then the gate-source voltage is positive, and the MOSFET $Q_i'$ is on/closed and allows the current to pass; and when the value of $V_c^s$ is $V_1^-$ (i.e. when $V_\Sigma^s \geq V_\Sigma$) then the gate-source voltage is negative or zero, and the MOSFET $Q_i'$ is off/open: the bypass circuit $204_i$ is open and does not carry current.

The second comparator 206 is common to all the storage devices $DC_1, \ldots, DC_n$. In other words, the control voltage $V_c^s$ supplied by the second comparator 206 is used in order to actuate the bypass circuit of all the storage devices $DC_1, \ldots, DC_n$.

Figure 3:
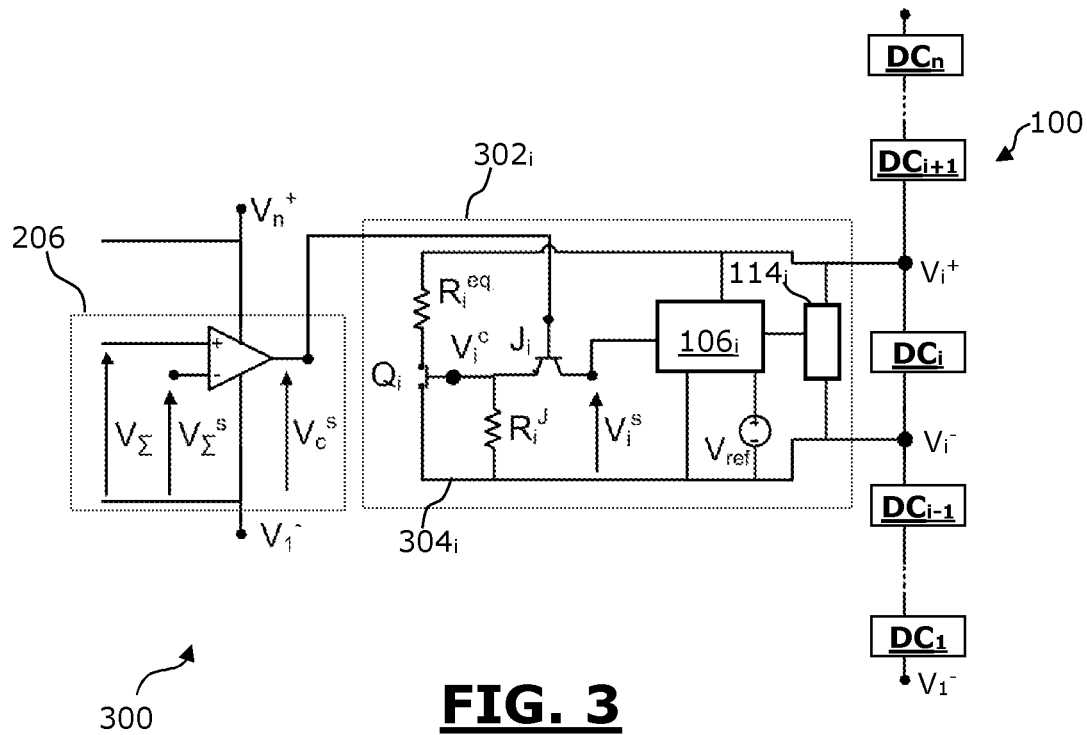
FIG. 3 is a representation of the schematic diagram of a second embodiment example of a controlled-resistor balancing system according to the invention.

FIG. 3 is a representation of the schematic diagram of a second non-limitative embodiment example of a balancing system according to the invention.

The balancing system 300 in FIG. 3 comprises the second comparator 206 of the system 200 in FIG. 2.

The balancing system 300 also comprises for each storage device $DC_1, \ldots, DC_n$, an identical controlled-resistor balancing device since all the storage devices $DC_1, \ldots, DC_n$ are identical.

In order not to overload the diagram, only the balancing device $302_i$, associated with the storage device $DC_i$, is shown in FIG. 3.

The balancing device $302_i$ comprises a bypass circuit $304_i$ of the storage device DC comprising the balancing resistor $R_i^{eq}$ in series with a single switch, namely the switch $Q_i$. In the system 300, the switch $Q_i$ is actuated as a function of both the voltage $V_i^s$ supplied by the first comparator $106_i$ and the voltage $V_c^s$ supplied by the second comparator 206.

To this end, the balancing device $302_i$ comprises a control means receiving on the one hand, the voltage $V_i^s$ supplied by the first comparator $106_i$, and on the other hand the voltage $V_c^s$ supplied by the second comparator 206. In particular, the control means is a control transistor that is open by default, denoted $J_i$, such as a bipolar transistor of the NPN type, and mounted such that:

the base of the transistor $J_i$ receives the voltage $V_c^s$, the collector of the transistor $J_i$ receives the voltage $V_i^s$, and the emitter of the transistor $J_i$ actuates the switch $Q_i$, by means of a control voltage denoted $V_i^c$.

As described above, the switch $Q_i$ can be an N-channel MOSFET.

Under these conditions, the switch $Q_i$ of the bypass circuit $304_i$ is actuated in the following manner:

if the voltage at the terminals of the storage device $DC_i$ has not reached the balancing voltage $V_{eq}$, then $V_i^s = V_i^-$ and $V_c^s = V_n^+$. As a result, the bipolar transistor $J_i$ is open and the voltage $V_i^-$ reaches the switch $Q_i$ which is then off/open: the bypass circuit $304_i$ does not allow the current to pass;

if the voltage at the terminals of the storage device $DC_i$ has reached the balancing voltage $V_{eq}$, but not all the bypass circuits of all the storage devices are closed/switched on, then $V_i^s = V_i^+$ and $V_c^s = V_n^-$. As a result, the bipolar transistor $J_i$ is on and the voltage $V_i^-$ reaches the switch $Q_i$ which is then on/closed: the bypass circuit $304_i$ allows the current to pass; and if the voltage at the terminals of the storage device $DC_i$ has reached the balancing voltage, and all the bypass circuits of all the storage devices are closed/switched on, then $V_i^s = V_i^+$ and $V_c^s = V_1^-$. As a result, the bipolar transistor $J_i$ is off and the voltage $V_i^-$ reaches the switch $Q$ via a resistor $R_i^j$ connecting the gate of the switch $Q_i$ to the potential $V_i^-$. The switch $Q_i$ is then off/open: the bypass circuit $304_i$ is open and does not allow the current to pass.

In the examples described in FIGS. 2 and 3, the voltage $V_i$ is supplied to the comparator $106_i$ in the same way as in the balancing device $112_i$ in FIG. 1b, using a voltage divider $114_i$. Alternatively, the voltage $V_i$ can be supplied to the comparator $106_i$ in the same way as in the balancing device $102_i$ in FIG. 1a, without using the voltage divider.

In addition, in the examples described, the second comparator 206, common to all the bypass circuits, is an inverting comparator. Alternatively, the second comparator 206 may not be an inverting comparator. In this case, it can be referenced to the potentials $V_1^-$ and $V_n^+$. Under these conditions, the second comparator 206 returns a voltage $V_c^s = V_1^-$ if $V_\Sigma^s < V_\Sigma$ and $V_n^+$ otherwise.

In this case, in the system 200 in FIG. 2, the switch $Q_i'$ must be a switch that is closed by default such as for example a P-channel MOSFET.

In the system 300 in FIG. 3, the control means $J_i$ of the switch $Q_i$ must alternatively be a control transistor that is closed by default, such as a bipolar transistor of the PNP type.

Figure 4:
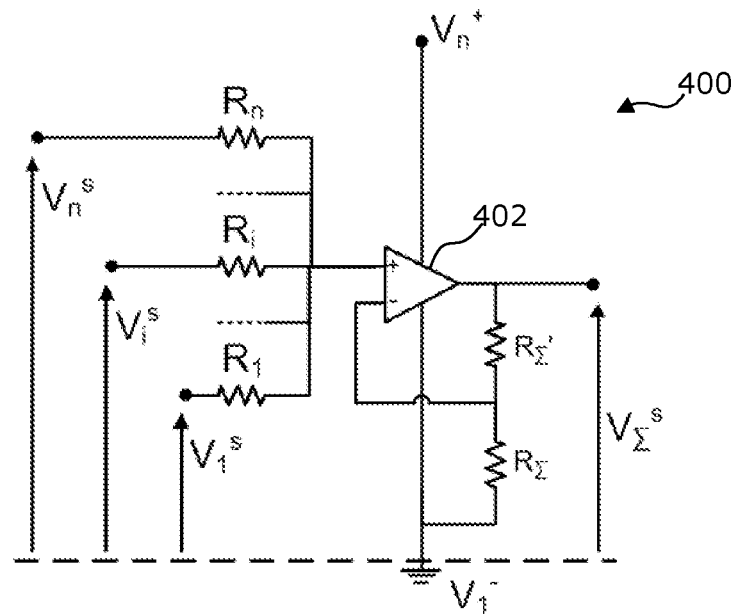
FIG. 4 is a representation of the schematic diagram of an example of a module supplying a voltage relative to the switched-on or switched-off state of all the bypass circuits of all the storage devices, and capable of being implemented in the system according to the invention.

FIG. 4 is a representation of the schematic diagram of a non-limitative example of a module supplying the voltage $V_\Sigma^s$, relative to the switched-on or switched-off state of all the bypass circuits of all the storage devices, capable of being used in the system according to the invention, and in particular in the systems 200 and 300 in FIGS. 2 and 3.

In particular, FIG. 4 is a representation of the wiring diagram of a module 400 supplying the voltage $V_\Sigma^s$ from the voltages $V_1^s, \ldots, V_n^s$, supplied by the first comparators $106_i$ of the balancing devices $202_i$, $302_i$ respectively, of all the storage devices $DC_i$, $i=1, \ldots, n$.

It should be recalled that each voltage $V_i^s$ is a function of the voltage $V_i$ at the terminals of the storage device $DC_i$ as described with reference to FIGS. 1a and 1b, such that:

$V_i^s = V_i^-$ before the bypass circuit of the storage device $DC_i$, is switched on, i.e. when the bypass circuit of the storage device $DC_i$ is in the open state; and $V_i^s = V_i^+$ after the bypass circuit of the storage device $DC_i$ is switched on, i.e. when the bypass circuit of the storage device $DC_i$ is in the closed state.

The module 400 consists of a weighted summer comprising an operational amplifier 402, referenced to the potentials $V_1^-$ and $V_n^-$ at the terminals of the storage assembly 100.

Two feedback resistors $R_\Sigma$ et $R_\Sigma'$ are connected to the output of the operational amplifier 402. As shown in FIG. 4, the operational amplifier 402 is arranged in order to receive, at its positive input, all the voltages $V_i^s$ supplied by all the first comparators 1061, via resistors $R_i$ with i=1, . . . , n. At the output, the weighted summer 402 supplies the voltage $V_\Sigma^s$, corresponding to the weighted sum of all the voltages $V_i^s$, according to the following relationship:

$$V_\Sigma^s = \frac{R_\Sigma + R_\Sigma'}{R_\Sigma} \times \frac{\sum_{i=1}^n \frac{V_i^s}{R_i}}{\sum_{i=1}^n \frac{1}{R_i}}$$

The resistors $R_\Sigma$ and $R_\Sigma'$ and the resistors $R_i$, are selected so that the maximum value of the voltage $V_\Sigma^s$ is limited to the potential difference at the terminals of the storage assembly 100, namely $(V_n^+ - V_1^-)$.

Thus, assuming that:

$$k = \frac{R_\Sigma + R_\Sigma'}{R_\Sigma}$$

when all the storage devices $DC_1, \ldots, DC_n$ are identical and have the same balancing voltage $V_{eq}$:

$$\frac{\frac{1}{R_i}}{\sum_{i=1}^n \frac{1}{R_i}} = \frac{1}{ik} \text{ with } i = 1, \ldots, n.$$

is obtained, where i=1, . . . , n.

These relationships make it possible to define the value of the resistors used in the module 400, as well as the value of k. Starting from the relationships above, by calculation:

$$k = \sum_{i=1}^n \frac{1}{i}$$

$R_i = i \times R_{ref}$, and $R_\Sigma' = (k-1)R_\Sigma$ are obtained, where $R_{ref}$ is an arbitrary resistor, but sufficiently high to limit the input current of the operational amplifier 402. For example, $R_{ref}$ can be selected such that $R_{ref} > 10$ kΩ. In addition, $R_\Sigma$ appears as an arbitrary resistor. Here too, $R_\Sigma$ is selected to be sufficiently high to limit the output current of the operational amplifier. For example, $R_\Sigma$ can be selected such that $R_\Sigma > 10$ kΩ.

The table below gives some values of k for values of n.

| n | 2 | 4 | 6 | 8 | 10 | 12 | 20 | 24 |
|---|---|---|---|---|---|---|---|---|
| k | 1.5 | 2.083 | 2.45 | 2.718 | 2.929 | 3.103 | 3.598 | 3.776 |

Figure 5:
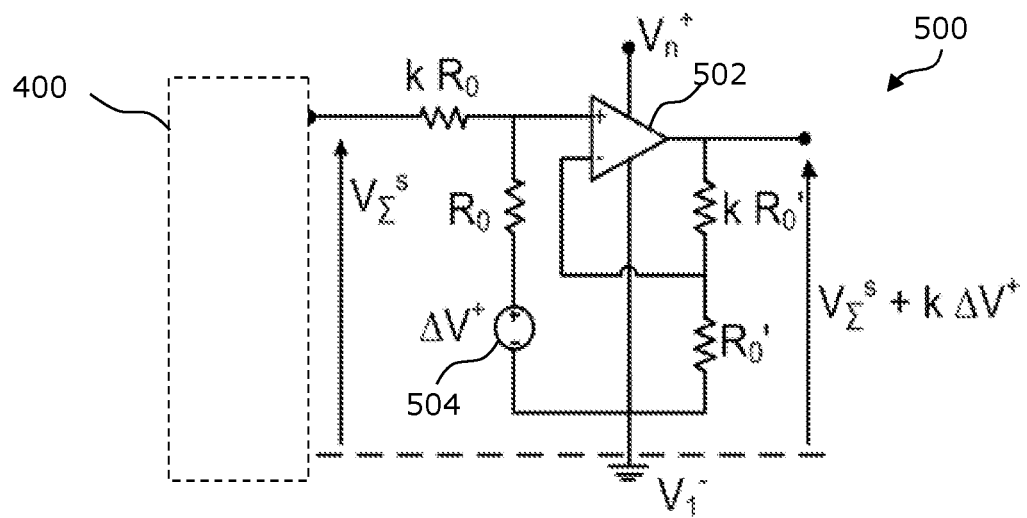
FIG. 5 is a representation of the schematic diagram of an example of a module for compensating an offset that can be produced at the level of voltages supplied by the first comparators of the system according to the invention, and capable of being implemented in the system according to the invention.

FIG. 5 is a representation of the schematic diagram of an example of a compensation module for taking into account an offset that may occur at the level of the voltages supplied by the first comparators of the system according to the invention, and suitable for being implemented in the system according to the invention, and in particular in the systems 200 and 300 in FIGS. 2 and 3.

In fact, for practical production or cost reasons, the signal $V_i^s$ sent by the first comparators $106_i$ is not necessarily equal to $V_i^-$ or $V_i^+$. There can be a shift, or offset, positive in the case of the low level, negative in the case of the high level. Therefore:

$V_i^s = V_i^- + \Delta V_i^-$ if $V_i^+ - V_i^- < V_{eq}$, $\Delta V_i^- > 0$
$V_i^s = V_i^+ - \Delta V_i^+$ if $V_i^+ - V_i^- \geq V_{eq}$, $\Delta V_i^+ > 0$ In order to take account of this offset, it is possible to add, at the output of the weighted summer 400, an offset compensation $+k\Delta V'$.

This addition can be performed by a compensation module 500 as shown in FIG. 5 arranged at the output of, and in cascade with, the weighted summer 400 in FIG. 4.

The module 500 comprises a summer, implemented by an operational amplifier 502, referenced to the potentials $V_1^-$ and $V_n^+$ at the terminals of the storage assembly 100.

At its positive input, the summer 502 receives:
the voltage $V_\Sigma^s$ supplied by the weighted summer, through a resistor $kR_0$ (k having the value defined above), and
the voltage $\Delta V^+$ supplied by a voltage source 504, through a resistor $R_0$;
and supplies at output the sum $(V_\Sigma^s + k\Delta V^+)$.

Two terminating resistors $kR_0'$, $R_0'$ respectively, are used at the output of the operational amplifier 502, in order to connect the output of the operational amplifier 502 to its negative input, respectively to the voltage source 504. The resistors $R_0$ and $R_0'$ are arbitrary resistors of sufficiently high value, for example of a value greater than 10 kΩ each, in order to limit the currents at the input and the output of the operational amplifier 502.

In the case where the system according to the invention implements such a compensation module 500, the second comparator 206 performs a comparison of the voltage $V_\Sigma$ to the voltage $(V_\Sigma^s + k\Delta V^+)$, and not to the voltage $V_\Sigma^s$.

Alternatively, the offset compensation can be performed at the input of the weighted summer, such as the summer 400 in FIG. 4, by adding a $(n+1)^{th}$ parallel branch at the input of the summer 400, this $(n+1)^{th}$ branch conveying an offset voltage, summed with the other voltages, such that $V_\Sigma^s = V_n^+$.

According to yet another alternative, the offset compensation can be performed taking into account said offset in the switch-off voltage $V_\Sigma$.

Figure 6:
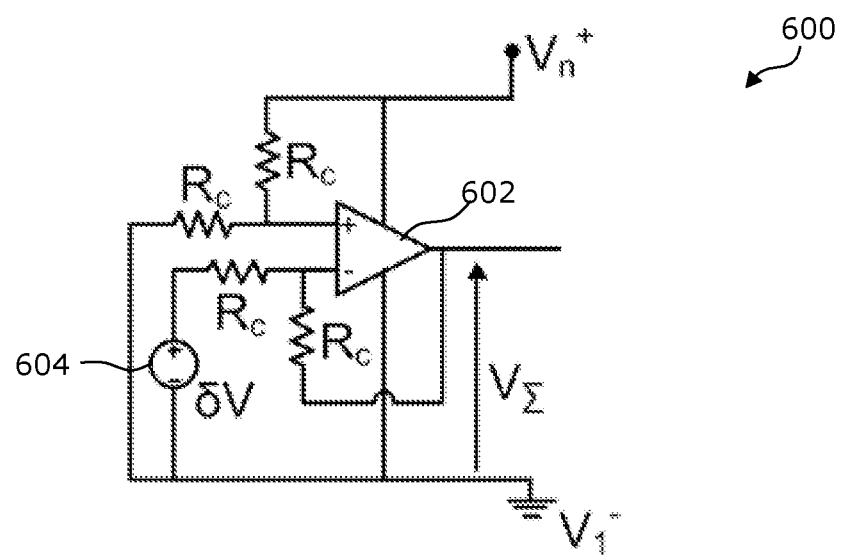
FIG. 6 is a representation of the schematic diagram of an example of a module supplying the switch-off voltage, and capable of being implemented in the system according to the invention.

FIG. 6 is a representation of the schematic diagram of a non-limitative example of a module supplying the switch-off voltage, $V_\Sigma$, and capable of being implemented in the system according to the invention, and in particular in systems 200 and 300 in FIGS. 2 and 3.

The module 600, shown in FIG. 6, comprises:
a voltage subtractor comprising an operational amplifier 602, referenced to the potentials $V_1^-$ and $V_n^+$ (at the terminals of the storage assembly 100); and
a voltage source 604 supplying a voltage $\delta V$ referenced to the potential $V_1^-$.

The operational amplifier 602 receives, at its positive input, the voltage $V_n^+$, and at its negative input, the voltage $\delta V$. At the output, the operational amplifier 602, and thus the module 600, supplies a voltage $V_\Sigma$ corresponding to the difference:

$V_\Sigma = V_n^+ - \delta V.$

The voltage $\delta V$ can be selected such that $$\delta V = \frac{V_{eq}}{2n'}$$

where $V_{eq}$ is the balancing voltage. Thus, the switch-off voltage $V_\Sigma$ verifies the relationship:

$$V_\Sigma = V_n^+ - \frac{V_{eq}}{2n}$$

Knowing that, in the majority of applications, the storage devices $DC_1, \ldots, DC_n$ are identical, each comprising only a single supercapacitor, and have the same balancing voltage $V_{eq}$ verifying $2 \text{ V} \le V_{eq} \le 3 \text{ V}$, and that the expected accuracy $\delta V$ of the analogue electronics is greater than or equal to 50 mV, the value of n can be selected such that $8 \le n \le 14$, and preferentially $10 \le n \le 12$.

Figure 7:
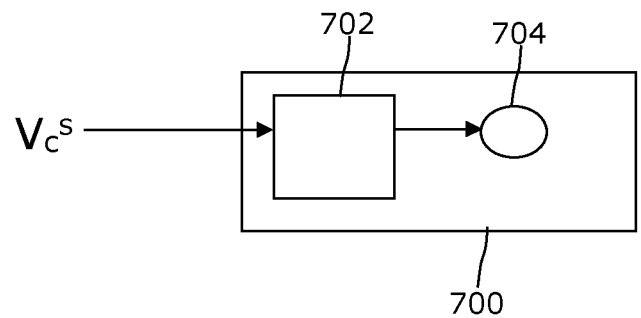
FIG. 7 is a diagrammatic representation of a non-limitative embodiment example of a module for monitoring the operation of a system according to the invention.

FIG. 7 is a diagrammatic representation of an embodiment example of a monitoring device capable of being implemented in the system according to the invention, and in particular in the systems 200 and 300 in FIGS. 2 and 3.

The monitoring device 700, shown in FIG. 7, takes at the input the signal $V_c^s$ supplied by the second comparator 206 and monitors the value of the voltage $V_c^s$.

It should be remembered that the voltage $V_c^s = V_n^+$ when all the bypass circuits of all the storage devices $DC_i$ have switched on, i.e. they are in a closed state allowing the current to pass. This value $V_n^+$ defines a high state of the voltage $V_c^s$ (non-zero voltage with respect to $V_1^-$). Conversely, the voltage $V_c^s = V_1^-$ when there is at least one storage device $DC_i$ the bypass circuit of which is not switched on and is in an open state not allowing the current to pass. This value $V_1^-$ defines a low state of the voltage $V_c^s$ (zero voltage with respect to $V_1^-$).

The monitoring device 700 is configured in order to monitor the value of the voltage $V_c^s$ with a view to determining if the voltage $V_c^s$ regularly passes to the high state, defined by the value $V_n^+$, then to the low state, defined by the voltage $V_1^-$.

If this is the case, this means that the balancing system is operating correctly.

If this is not the case, it indicates malfunctioning of the balancing system. The malfunction may be linked to:
- the electronic part which actuates the switching of $V_c^s$, which is malfunctioning: this groups together the connections carrying the potentials $V_i+$ and $V_i^-$ from the storage devices to the comparators, the electronics generating the voltages $V_i^s$, and the electronics generating $V_c^s$;
- the electronic part which performs the balancing, which is malfunctioning: this groups together the connections linking the balancing resistors to the storage devices, the balancing resistors themselves, the switching electronics of the balancing circuits (typically the switches $Q_i$ and $Q_i'$) and the control electronics of said switches (typically the switches $J_i$);
- the balancing system that is not able to balance: this groups together the case of a major malfunction within the storage devices or the balancing resistors: a typical case would be balancing resistors having different values, i.e. different balancing currents, within one and the same set of balancing circuits.

The device 700 can comprise a comparator 702 comparing the voltage $V_c^s$ to the voltage $V_n^+$ ($V_1^-$ respectively) and actuating for example an indicator light 704 as a function of said comparison. Thus, if the indicator light 704 emits a signal which turns on and off, the system is operating correctly. Conversely, if the indicator light 704 emits a signal that remains steady (on or off), this means that the system is not operating correctly.

Of course, any other means of transmitting a voltage change can be used in place of the indicator light.

Figure 8:
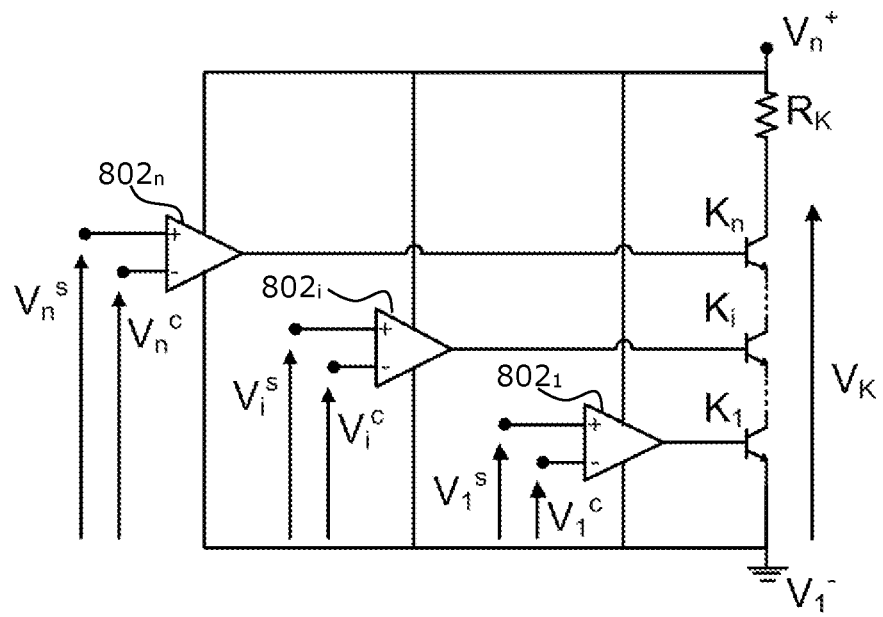
FIG. 8 is a diagrammatic representation of another non-limitative embodiment example of a module for monitoring the operation of a system according to the invention.

FIG. 8 is a diagrammatic representation of another embodiment example of a monitoring module that can be implemented in the system according to the invention, and in particular in the system 300 in FIG. 3.

The monitoring module 800 comprises for each storage device $DC_i$ a comparator $802_i$, referenced to the potentials $V_n^+$ and $V_1^-$ at the terminals of the storage assembly 100, and receiving:
- at its positive input the voltage $V_i^s$ supplied by the first comparator 1061 connected to said storage device $DC_i$, and
- at its negative input, the voltage $V_i^c$ supplied by the control means $J_i$ connected to said storage device $DC_i$.

Each comparator $802_i$ thus compares the voltages $V_i^s$ and $V_i^c$ so that if $V_i^s \le V_i^c$, the value of the output voltage of the comparator is $V_1^-$, and if $V_i^s > V_i^c$ the value of the output voltage of the comparator is $V_n^+$.

Each comparator $802_i$ actuates a switch denoted $K_i$ which can for example be a bipolar transistor of the NPN type, which is open by default and closed when the voltage supplied by the comparator is equal to $V_n^+$.

The switches $K_1, \ldots, K_n$, actuated respectively by the comparators $802_1, \ldots, 802_n$, are connected together in series and with a resistor $R_K$, between the potentials $V_n^+$ and $V_1^-$.

Thus, when there is at least one switch $K_i$ that is open, then no current passes into the resistor $R_K$ and the value of the voltage $V_K$ at the negative terminal of the resistor $R_k$ is $V_n^+$, which corresponds to a high state (non-zero voltage with respect to $V_1^-$). When all the switches $K_i$ are closed, then a current passes through the resistor $R_K$ and the value of the voltage $V_K$ at the negative terminal of the resistor $R_K$ terminals is $V_1^+$, which corresponds to a low state (zero voltage with respect to $V_1^-$).

The resistor $R_k$ is an arbitrary resistor of sufficiently high value, for example of a value greater than 10 k$\Omega$, in order to limit the current that passes through all the switches $K_1, \ldots, K_n$.

This voltage $V_K$ can be used in order to monitor the operation of the balancing system, for example by turning on an indicator light (not shown in FIG. 8).

Alternatively, each comparator $802_i$ can be local to the balancing device $302_i$ of each storage device $DC_i$.

Figure 9:
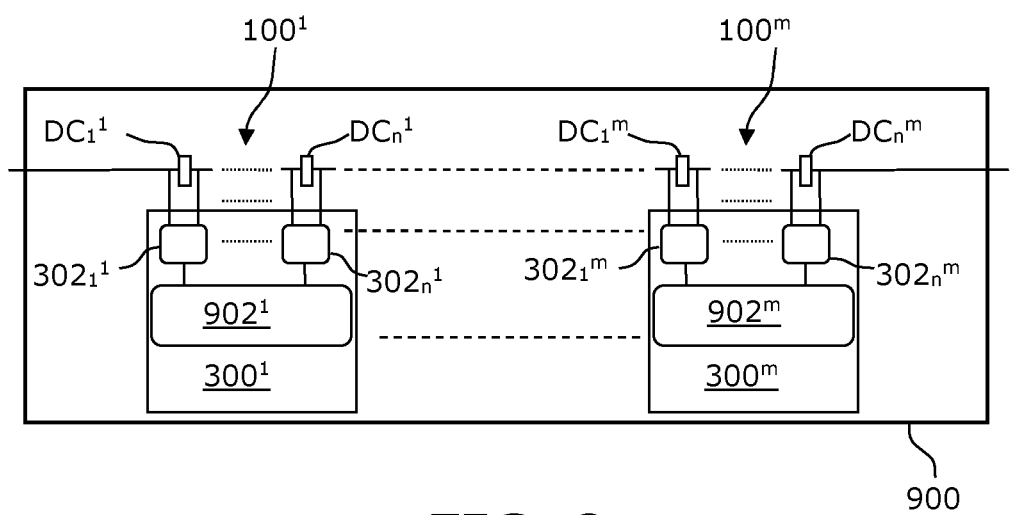
FIG. 9 is a diagrammatic representation of a non-limitative embodiment example of a storage module according to the invention.

FIG. 9 is a diagrammatic representation of a non-limitative embodiment example of a storage module according to the invention.

The storage module 900, shown in FIG. 9, comprises several storage assemblies $100^1, \ldots, 100^m$ each comprising several storage devices connected together in series.

The assemblies $100^1, \ldots, 100^m$ can be connected together in series or in parallel.

A balancing system $300^j$ such as for example the system 300 in FIG. 3, is connected to each assembly $100^j$.

A balancing device $302_i^j$ such as for example the balancing device $302_i$ in FIG. 3, is connected to each storage device $DC_i^j$, $1 \le i \le n$ and $1 \le j \le m$.

A management module 902 is associated with each assembly 100$^j$, comprising:
- a second comparator, such as for example the second comparator 206 in FIG. 3;
- a weighted summer, such as for example the weighted summer 400 in FIG. 4;
- a module supplying the switch-off voltage, such as for example the module 600 in FIG. 6;
- optionally, an offset compensation module, such as for example the module 500 in FIG. 5; and
- optionally, a monitoring module, such as for example the monitoring module 700 in FIG. 7, or the monitoring module 800 in FIG. 8.

The storage module 900 can be used in a rechargeable electric or hybrid transport vehicle, that can be a bus, a car, a tyred tram, a boat, a lorry, a cable car, a goods lift, a crane etc.

The storage module 900 can also be used in an electrical installation that can be:
- an electrical charging station for electric or hybrid vehicles,
- an electrical supply station of a building, a complex or an electric/electronic communication device, or
- a station for regulating or smoothing, or buffer storage, for electrical energy.

FIGS. 10a-10d are non-limitative embodiment examples of a capacitive-effect electrical energy storage device.

Each storage device $DC_i$ can be any one of the storage devices described with reference to FIGS. 10a-10d.

Figure 10A:
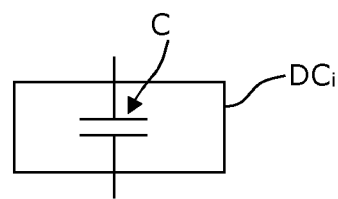
FIGS. 10a-10d are non-limitative embodiment examples of a capacitive-effect electrical energy storage device.

The storage device $DC_i$ shown in FIG. 10a comprises a single supercapacitor C. It is this device example that has been considered in the examples described above with reference to FIGS. 1-9.

Of course, the invention is not limited to this example.

Figure 10B:
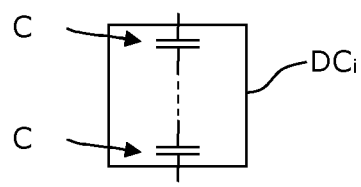

For example, the storage device $DC_i$ shown in FIG. 10b comprises a plurality of supercapacitors C mounted in series.

Figure 10C:
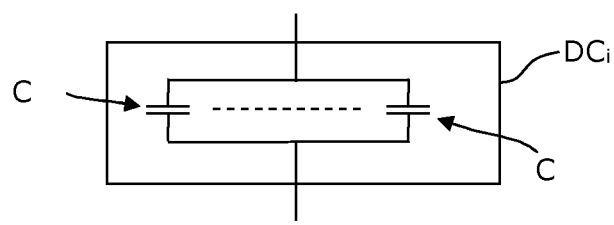

The storage device $DC_i$ shown in FIG. 10c comprises a plurality of supercapacitors C mounted in parallel.

Figure 10D:
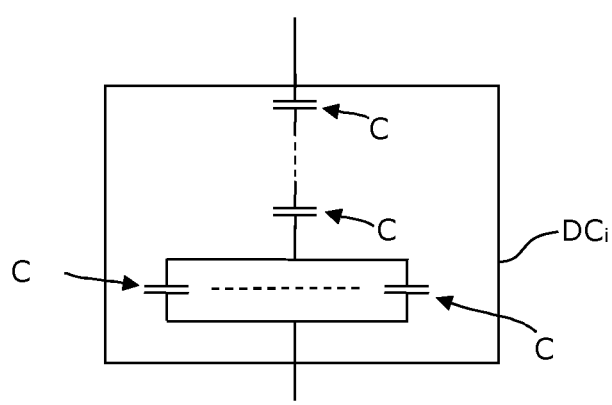

The storage device $DC_i$ shown in FIG. 10d comprises a group of one or more supercapacitors C mounted in series with a group of at least two supercapacitors mounted together in parallel.

Of course, the invention is not limited to the examples outlined above.

The invention claimed is:

1. An analogue balancing system for a rechargeable electrical energy storage assembly comprising: a plurality of capacitive-effect storage devices connected together in series; said system comprising a balancing device for each storage device comprising:
   - a bypass circuit of said storage device, that can be actuated between a closed state and an open state; and
   - a voltage comparator, called first comparator, arranged in order to actuate said bypass circuit to an open or closed state, as a function of the voltage at the terminals of said storage device and a predetermined voltage, called balancing voltage;
   said system also having at least one other voltage comparator, called second comparator, arranged in order to actuate an open or closed state of the bypass circuit of each storage device, as a function of:
   - a voltage, called switch-off voltage, representative of a closed state of all the bypass circuits of all the storage devices of said assembly; and
   the voltage at the terminals of each storage device of said assembly, or of the voltage at the terminals of said assembly.

2. The system according to claim 1, characterized in that the second comparator is referenced to the potentials at the terminals of the storage assembly, and is configured in order to supply at the output:
   - in a first state: the lowest potential at the terminals of the storage assembly; and
   - in a second state: the highest potential at the terminals of the storage assembly.

3. The system according to claim 1, characterized in that it comprises a weighted summer, receiving the voltage supplied by each said first comparator, and supplying a voltage corresponding to a weighted sum of said voltages, said weighted sum voltage being used by the second comparator in order to actuate all the bypass circuits.

4. The system according to claim 3, characterized in that the weighted summer is referenced to the potentials at the terminals of the storage assembly, and supplies a weighted sum voltage less than or equal to the difference between said potentials.

5. The system according to claim 3, characterized in that it also comprises:
   - an additional branch at the input of the weighted summer; or
   - a second summer at the output of the weighted summer; introducing a voltage, called compensation voltage, corresponding to a voltage offset introduced at the level of at least one the first comparator.

6. The system according to claim 1, characterized in that it comprises a means supplying the switch-off voltage as a function of the voltage at the terminals of the storage assembly, and optionally of a voltage representing a safety margin.

7. The system according to claim 6, characterized in that the means supplying the switch-off voltage comprises a subtractor, referenced to the potentials at the terminals of the storage assembly, supplying the switch-off voltage as a function of the voltage at the terminals of the storage assembly and the voltage representing a safety margin.

8. The system according to claim 1, characterized in that for at least one, in particular each, storage device, the first comparator of the balancing device of said storage device is referenced to the potentials at the terminals of said storage device.

9. The system according to claim 1, characterized in that at least one of the first and second comparators is a hysteresis comparator.

10. The system according to claim 1, characterized in that at least one, in particular each, bypass circuit comprises two switches, mounted in series in said bypass circuit, one actuated as a function of the voltage supplied by the first comparator and the other actuated as a function of the voltage supplied by the second comparator.

11. The system according to claim 1, characterized in that at least one, in particular each, bypass circuit comprises a single switch, the balancing device further comprising a control means of said single switch, as a function of the voltages supplied by the first and second comparators.

12. The system according to claim 11, characterized in that the control means comprises:
   - a transistor that is off by default, for example a bipolar transistor of the NPN type, in particular when the second comparator is an inverting comparator; or a transistor that is on by default, for example a bipolar transistor of the PNP type, in particular when the second comparator is a non-inverting comparator.

13. The system according to claim 1, characterized in that it also comprises a device for monitoring the operation of said system as a function of the voltage supplied by the second comparator.

14. The system according to claim 11, characterized in that it comprises a device for monitoring the operation of said system as a function of the control voltages of said single switches of all the bypass circuits.

15. The system according to claim 11, characterized in that it comprises a device for monitoring the operation of said system as a function of:
the control voltage of said single switch, and
the voltage supplied by the first comparator;
of each balancing device.

16. A rechargeable electrical energy storage module comprising:

at least one rechargeable electrical energy storage assembly, each comprising a plurality of capacitive-effect electrical energy storage devices connected together in series within said assembly, and for at least one, in particular each, storage assembly, a balancing system according to claim 1.

17. An electric or hybrid transport vehicle comprising one or more rechargeable electrical energy storage module(s) according to claim 16.

18. An electrical installation, such as an electrical charging station for electric or hybrid transport vehicles, or an electrical supply station of a building, a complex or an electric/electronic communication device, or a regulating or smoothing station for electrical energy, comprising one or more rechargeable electrical energy storage module(s) according to claim 16.

* * * * *